(12) United States Patent
Liang et al.

(10) Patent No.: US 9,013,511 B2
(45) Date of Patent: Apr. 21, 2015

(54) ADAPTIVE SPATIAL VARIANT INTERPOLATION FOR IMAGE UPSCALING

(75) Inventors: Yi Liang, San Diego, CA (US); King-Chung Lai, San Diego, CA (US); Khaled Helmi El-Maleh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1775 days.

(21) Appl. No.: 11/502,233

(22) Filed: Aug. 9, 2006

(65) Prior Publication Data

US 2008/0036792 A1 Feb. 14, 2008

(51) Int. Cl.
*G09G 5/00* (2006.01)
*G06T 3/40* (2006.01)

(52) U.S. Cl.
CPC .................... *G06T 3/4007* (2013.01)

(58) Field of Classification Search
USPC ......................................................... 345/660
See application file for complete search history.

(56) References Cited

U.S. PATENT DOCUMENTS

| | | | |
|---|---|---|---|
| 5,801,787 A | 9/1998 | Schein et al. | |
| 6,018,597 A * | 1/2000 | Maltsev et al. | 382/260 |
| 6,333,762 B1 * | 12/2001 | Yoo et al. | 348/441 |
| 6,408,028 B1 * | 6/2002 | Manjunath et al. | 375/240.08 |
| 6,604,070 B1 | 8/2003 | Gao et al. | |
| 6,608,699 B2 * | 8/2003 | Kishimoto | 358/1.2 |
| 6,756,993 B2 * | 6/2004 | Popescu et al. | 345/646 |
| 6,970,597 B1 * | 11/2005 | Olding et al. | 382/167 |
| 7,142,645 B2 | 11/2006 | Lowe | |
| 7,420,956 B2 | 9/2008 | Karaoguz et al. | |
| 7,505,605 B2 | 3/2009 | Rhoads et al. | |
| 7,570,761 B2 | 8/2009 | Risan et al. | |
| 7,917,959 B2 | 3/2011 | Kellerman et al. | |
| 2002/0116533 A1 | 8/2002 | Holliman et al. | |

(Continued)

FOREIGN PATENT DOCUMENTS

| | | |
|---|---|---|
| EP | 1696594 | 8/2006 |
| JP | 10190564 A | 7/1998 |

(Continued)

OTHER PUBLICATIONS

Giovanni Ramponi: "Warped distance for Space-Variant Linear Image Interpolation" IEEE Transactions on Image Processing, IEEE Service Center, Piscataway, NJ, USA, vol. 8, No. 5, May 1999, pp. 629-639, XP011026322.

(Continued)

*Primary Examiner* — Edward Martello
(74) *Attorney, Agent, or Firm* — James R. Gambale, Jr.

(57) ABSTRACT

This disclosure describes adaptive spatial variant interpolation (SVI) techniques for image upscaling. In various embodiments, the interpolation techniques described in this disclosure may support low complexity upscaling of image while promoting high image quality, including enhanced sharpness, higher contrast and more accurate interpolation. The interpolation techniques may be applied using generalized finite impulse response (FIR) filters. In some embodiments, the interpolation techniques may be content-adaptive to provide more accurate interpolation while suppressing significant artifacts associated with sharp edges. In addition, the interpolation techniques may be readily applicable to upscaling of color imagery and video, e.g., in both YCbCr (luminance, blue chrominance, red chrominance) and RGB (red, green, blue) formats.

37 Claims, 5 Drawing Sheets

(56) References Cited

U.S. PATENT DOCUMENTS

| | | |
|---|---|---|
| 2002/0122137 A1 | 9/2002 | Chen et al. |
| 2002/0138840 A1 | 9/2002 | Schein et al. |
| 2003/0065802 A1 | 4/2003 | Vitikainen et al. |
| 2003/0185463 A1* | 10/2003 | Wredenhagen et al. ...... 382/300 |
| 2003/0189579 A1* | 10/2003 | Pope .............................. 345/660 |
| 2003/0193619 A1 | 10/2003 | Farrand |
| 2003/0204613 A1 | 10/2003 | Hudson et al. |
| 2003/0220785 A1 | 11/2003 | Collins et al. |
| 2004/0128324 A1 | 7/2004 | Sheynman et al. |
| 2004/0139233 A1 | 7/2004 | Kellerman et al. |
| 2004/0237104 A1 | 11/2004 | Cooper et al. |
| 2004/0249768 A1 | 12/2004 | Kontio et al. |
| 2005/0096938 A1 | 5/2005 | Slomkowski et al. |
| 2005/0188399 A1 | 8/2005 | Tischer |
| 2005/0197108 A1 | 9/2005 | Salvatore et al. |
| 2005/0198290 A1 | 9/2005 | Berkey et al. |
| 2005/0203849 A1 | 9/2005 | Benson |
| 2005/0220072 A1 | 10/2005 | Boustead et al. |
| 2005/0226538 A1* | 10/2005 | Di Federico et al. ......... 382/299 |
| 2005/0276570 A1 | 12/2005 | Reed, Jr. et al. |
| 2006/0010203 A1 | 1/2006 | Mrsic-Flogel et al. |
| 2006/0015649 A1 | 1/2006 | Zutaut et al. |
| 2006/0045385 A1* | 3/2006 | Nishimura .................... 382/300 |
| 2006/0139376 A1* | 6/2006 | Le Dinh et al. ............... 345/660 |
| 2006/0182091 A1 | 8/2006 | Park et al. |
| 2006/0184975 A1 | 8/2006 | Casey |
| 2006/0193295 A1 | 8/2006 | White et al. |
| 2006/0262785 A1 | 11/2006 | Duggal et al. |
| 2007/0003167 A1* | 1/2007 | Ferretti et al. ................ 382/300 |
| 2007/0036175 A1 | 2/2007 | Zimmermann et al. |
| 2007/0047838 A1* | 3/2007 | Milanfar et al. .............. 382/289 |
| 2007/0116383 A1* | 5/2007 | De Haan ....................... 382/299 |
| 2007/0288638 A1 | 12/2007 | Vuong et al. |
| 2008/0115170 A1 | 5/2008 | Ray et al. |
| 2008/0126294 A1 | 5/2008 | Ray et al. |
| 2009/0154448 A1 | 6/2009 | Lee et al. |
| 2012/0131218 A1 | 5/2012 | Putterman et al. |

FOREIGN PATENT DOCUMENTS

| | | |
|---|---|---|
| JP | 11331070 A | 11/1999 |
| JP | 2000106688 | 4/2000 |
| JP | 2002197355 A | 7/2002 |
| JP | 2002259430 | 9/2002 |
| JP | 2003152736 A | 5/2003 |
| JP | 2003283422 A | 10/2003 |
| JP | 2004171138 A | 6/2004 |
| JP | 2004206459 A | 7/2004 |
| JP | 2005311670 A | 11/2005 |
| JP | 2005328267 A | 11/2005 |
| JP | 2005339130 A | 12/2005 |
| JP | 2006155562 A | 6/2006 |
| JP | 2006191349 A | 7/2006 |

OTHER PUBLICATIONS

Hadhoud M M et al: "Adaptive image interpolation based on local activity levels" Radio Science Conference, 2003. NRSC 2003. Proceedings of the 20th National Mar. 18-20, 2003, Piscataway, NJ, USA, IEEE Mar. 18, 2003, pp. C41-C48, XP010647330.

International Search Report—PCT/US07/075386, International Search Authority—European Patent Office—Jan. 22, 2008.

Liyong Ma et al: "Local activity level guided adaptive scan conversion algorithm" Engineering in medicine and biology society, 2005. IEEE-EMBS 2005. 27th Annual International Conference of the Shanghai, China Sep. 1-4, 2005, Piscataway, NJ, USA, IEEE Sep. 1, 2005, pp. 6718-6720, XP010907387, pp. 6718-6720.

Zotta F et al: "A directional edge-sensitive image interpolator" Proceedings of the SPIE—The International Society for Optical Engineering SPIE-Int. Soc. Opt. Eng, USA, vol. 5298, No. 1, 2004, pp. 212-219, XP002463111, Jan. 19, 2004.

* cited by examiner

ADAPTIVE SPATIAL VARIANT INTERPOLATION FOR IMAGE UPSCALING

TECHNICAL FIELD

The disclosure relates to imaging and, more particularly, to interpolation techniques for image scaling.

BACKGROUND

Display devices present a variety of image information, including image information captured by digital video or still photo cameras, image information produced by software applications, video games, or other programs, image information obtained from video or still photo archives, or image information obtained from broadcast or streaming media. A display device may be integrated with, coupled to, or otherwise associated with a variety of devices, such as desktop or laptop computers, computer workstations, mobile devices such as personal digital assistants (PDAs) or mobile telephones, and dedicated viewing stations such as televisions. A display device may comprise a liquid crystal display (LCD), a cathode ray tube (CRT) display, a plasma display, a projection display, or the like.

A display device maintains an inherent maximum resolution limited by the number of pixels capable of displaying the image information. In general, displays may produce a range of image resolution at or below the inherent maximum resolution. If the image information defines values for less than all of the display pixels, however, the device may scale the image information upward to a larger resolution. For example, a display device may produce additional pixels by interpolation to scale the image information to a larger format. As displays become larger, image scaling becomes increasingly important. For mobile applications, even though users may desire larger displays, channel limitations tend to reduce the amount of image information that can be transmitted to a mobile device, resulting in smaller format images. Hence, to consistently achieve larger formats, image upscaling is desirable for mobile applications.

Many techniques currently exist to interpolate pixel values to achieve image upscaling. Common interpolation techniques include bilinear interpolation, bicubic interpolation, cubic spline interpolation, and new edge directed interpolation (NEDI). While all of the above interpolation techniques are effective in upscaling the image information, artifacts such as blurring may result. In addition, some techniques, such as NEDI, may require complex calculations that consume an excessive amount of system resources, especially in small mobile devices. Further, some existing interpolation techniques may be unsuitable for color image information, resulting in color bleeding or other artifacts. In general, upscaling is challenging because more pixels have to be created by interpolating existing but limited information, possibly leading to blurriness in the output.

SUMMARY

This disclosure describes adaptive spatial variant interpolation (SVI) techniques for image upscaling. In various embodiments, the interpolation techniques described in this disclosure may support low complexity upscaling of image information while promoting high image quality, including enhanced sharpness, higher contrast and accurate interpolation. The interpolation techniques may be applied using generalized finite impulse response (FIR) filters. In some embodiments, the interpolation techniques may be content-adaptive to provide accurate interpolation while suppressing significant artifacts associated with sharp edges. In addition, the interpolation techniques may be readily applicable to upscaling of color imagery and video, e.g., in both YCbCr (luminance, blue chrominance, red chrominance) and RGB (red, green, blue) formats.

In one embodiment, the disclosure provides a method comprising determining a symmetry (A) of a scaled pixel in an image based on content characteristics of neighboring pixels in the image, determining an intensity (k) of a spatial variant interpolation filter based on the symmetry A, adjusting the spatial variant interpolation filter based on the intensity (k), and applying the spatial variant interpolation filter to interpolate the scaled pixel. In some embodiments, adjusting the spatial variant interpolation filter may include determining a warped distance (s') based on the symmetry (A) of the scaled pixel and the intensity (k) of the filter response, and adjusting the spatial variant interpolation filter based on the warped distance (s').

In another embodiment, the disclosure provides a device comprising a memory that stores an image, and a processor that determines a symmetry (A) of a scaled pixel in an image based on content characteristics of neighboring pixels in the image, determines an intensity (k) of an interpolation filter based on the symmetry A, adjusts the interpolation filter based on the intensity (k), and applies applying the spatial variant interpolation filter to interpolate the scaled pixel. In some embodiments, the processor may determine a warped distance (s') based on the symmetry (A) of the scaled pixel and the intensity (k) of the filter response, and adjust the spatial variant interpolation filter based on the warped distance (s').

The techniques described in this disclosure may be implemented in a hardware, software, firmware, or any combination thereof. If implemented in software, the software may be executed in a processor, such as a digital signal processor (DSP). The software that executes the techniques may be initially stored in a computer readable medium and loaded and executed in the processor. Accordingly, this disclosure also contemplates a computer readable medium comprising instructions to perform adaptive spatial variant interpolation techniques for image upscaling.

The details of one or more embodiments of the disclosure are set forth in the accompanying drawings and the description below. Other features and advantages of the disclosure will be apparent from the description and drawings, and from the claims.

DETAILED DESCRIPTION

Figure 1:
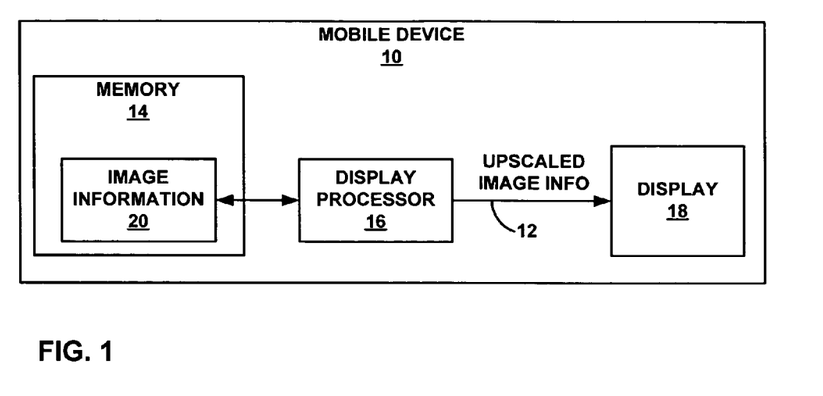
FIG. 1 is a block diagram illustrating an exemplary mobile device that displays image information that is upscaled according to the techniques described herein.

FIG. 1 is a block diagram illustrating an exemplary mobile device 10 that displays image information 12 that is upscaled according to the interpolation techniques described in this disclosure. As shown in FIG. 1, mobile device 10 includes a memory 14, a display processor 16, and a display 18. The features illustrated in FIG. 1 may be realized by any suitable combination of hardware and/or software components. Depiction of different features as units is intended to highlight different functional aspects of mobile device 10 and does not necessarily imply that such units must be realized by separate hardware and/or software components. Rather, functionality associated with one or more units may be integrated within common hardware and/or software components. Moreover, while described in reference to mobile device 10, other devices such as personal computers, laptops, workstations, and networked devices may employ the image upscaling techniques described in this disclosure. Thus, the disclosure should not be limited to the exemplary embodiment of mobile device 10.

In general, mobile device 10 is configured to apply adaptive spatial variant interpolation (SVI) techniques for image upscaling. In various embodiments, the interpolation techniques applied by mobile device 10 may support low complexity upscaling of image information while promoting high image quality, including enhanced sharpness, higher contrast and accurate interpolation. As will be described, the interpolation techniques may be applied using generalized finite impulse response (FIR) filters. In some embodiments, the interpolation techniques may be content-adaptive to provide accurate interpolation while suppressing significant artifacts associated with sharp edges. In addition, the interpolation techniques may be applicable to upscaling of color imagery and video. For example, the interpolation techniques may be applicable to color images and video in both YCbCr (luminance, blue chrominance, red chrominance) and RGB (red, green, blue) formats.

As will be described, in some embodiments, display processor 16 may be configured to adapt the intensity (k) of a filter response based on a plurality of neighboring pixels. The display processor 16 may first determine the symmetry (A) of a scaled pixel, i.e., a pixel that requires interpolation to determine its value, based on a plurality of neighboring pixels within the image information. Next, display processor 16 determines the intensity (k) of the filter response for the scaled pixel based on the symmetry (A) of the scaled pixel. Third, the display processor 16 determines a warped distance (s') based on the symmetry (A) of the scaled pixel and the intensity (k) of the filter response.

Display processor 16 then applies the filter based on the determined warped distance (s') to perform spatial variant interpolation to determine the value of the scaled pixel. Because the adaptive upscaling techniques enable display processor 16 to adapt the intensity (k) of the filter response based on the values of the neighboring pixels, the display processor may generate upscaled image information, which includes the scaled pixel, with relatively higher clarity when compared to other upscaling techniques.

The adaptive upscaling techniques also may enable display processor 16 to upscale image information encoded according to one of a plurality of color formats. For example, if the image information is encoded according to the RGB color format, display processor 16 may determine the warped distance (s') for the green (G) channel based on the symmetry (A) and the intensity (k). After making this determination, display processor 16 may apply the filter to interpolate the red (R), green (G), and blue (B) channel values of the scaled pixel based on the warped distance (s') determined for the green (G) color channel. As another example, if the image information is encoded according to the YCbCr color format, display processor 16 may determine the warped distance (s') for only the luminance (Y) color channel and apply the filter to only the Y channel to interpolate the Y channel value for the scaled pixel.

Mobile device 10 may be a mobile radiotelephone or satellite telephone, a personal digital assistant, or any other type of mobile device capable of manipulating and displaying image information. Mobile device 10 may be equipped with wireless and/or wired communication capabilities to receive and, optionally, transmit voice, video and/or data information. Processor 16 may be integrated with a modem that also handles demodulation and decoding of received image information, and optionally encoding and modulation of transmitted information.

Accordingly, mobile device 10 also may include appropriate transmit and receive electronics, e.g., for radio frequency, satellite, or infrared communication. Such electronics may include suitable filters, amplifiers, frequency upconverters, frequency downconverters, diplexers, and the like. Although mobile devices are described in this disclosure for purposes of illustration, the adaptive spatial variant interpolation techniques may be applicable to other devices that are not generally considered mobile, such as televisions, desktop computers, computer workstations, and the like.

In some embodiments, mobile device 10 may comprise an image capture device to capture image information as digital videos or digital still pictures. The image capture device may be a digital video camera, a digital still image camera, or a combination of both, and in these instances, the image capture device may be incorporated into mobile device 10, such as a mobile cellular telephone, to form a so-called camera phone or video phone. The image capture device preferably is equipped to capture color imagery, black-and-white imagery, or both. In this disclosure, the terms "image," "imagery," "image information," or similar terms may interchangeably refer to either video or still pictures.

With further reference to FIG. 1, memory 14 stores image information 20. Memory 14 may comprise any combination of static memory, such as a Read-Only Memory (ROM), an Electronically Programmable ROM (EPROM), a flash memory, a hard drive, and dynamic memory, such as a Random Access Memory (RAM), a Dynamic Random Access Memory (DRAM), a Static Random Access Memory (SRAM), and a cache. Image information 20 may comprise information captured by a digital video or still camera, information generated by an application, video game or other software program, or information obtained via broadcast or streaming media. Image information 20 may define values for pixels at a specified resolution, which may be less or greater than the resolution of display 18. Typically, however, image information 20 defines pixels values at a resolution lower than the maximum resolution of display 18.

Display processor 16 is coupled to memory 14 and display 18, e.g., via a system bus, memory bus, peripheral bus, or a combination thereof. In some embodiments, display processor 16 may take the form of a hardware accelerator embedded within a mobile station modem (MSM), and be responsible for transferring an upscaled image from an MSM memory subsystem to display 18. Also, in some embodiments, memory 14 may be embedded within display processor 16, such that memory 14 becomes a memory subsystem of display processor 16. Display processor 16 is responsible for transferring an updated image from memory 14 to display 18. Display processor 16 performs a set of operations on image information 20 obtained from a video or still photo capture device, from software applications, video games, or other programs, from a video or still picture archive, or from broadcast or streaming media. Exemplary operations include rotation, flipping, scaling, color conversion, gamma correction, blending, dithering, and other enhancements. Functional units for performing interpolation and other operations, such as those described above, may reside within a so-called video front end (VFE) of mobile device 10.

Processor 16 may be realized by one or more microprocessors, digital signal processors (DSPs), application specification integrated circuits (ASICs), field programmable gate arrays (FPGAs), or any other equivalent discrete or integrated logic circuitry. While not shown in FIG. 1, mobile device 10 may comprise a programmable processor capable of executing instructions that cause the program to execute the upscaling technique herein described, and processor 16 may represent a portion of such programmable processor. Accordingly, the disclosure also contemplates a computer-readable medium comprising instructions to cause a processor to perform techniques as described herein.

As described in more detail below, processor 16 applies spatial variant interpolation filter to image information 20 to generate upscaled image information 12 for display on display 18. Upscaling permits the image information 20 to be displayed at a higher resolution and larger size format. As examples, image information 20 can be spatially scaled upward from quarter common intermediate format (QCIF) to common intermediate format (CIF), from CIF to video graphics array (VGA), and/or from VGA to super VGA (SVGA). In this manner, a smaller image may be upscaled by spatial variant interpolation to provide a larger image for presentation on display 18. At the same time, interpolation techniques as described herein may be applied to maintain quality and reduce undesirable artifacts in the upscaled image.

To upscale image information 20, display processor 16 applies a filter first along the rows of the pixel values defined by image information 20 and second along the columns of the pixel values defined by image information 20. As it applies the filter, display processor 16 determines a symmetry (A) for the pixel value to be interpolated, i.e., a scaled pixel, based on a plurality of neighboring pixels within image information. The neighboring pixels may be selected to be within a predetermined distance of the pixel to be interpolated. Hence, the pixel to be interpolated is not originally present in the image data and needs to be interpolated based on pixels that are originally present in the image data. Interpolation of the pixel adds a pixel that increases the resolution of the image. A pixel to be interpolated may be referred to as the interpolated pixel or a scaled pixel. Interpolation of multiple pixels increases the overall resolution of the image and may permit spatial upscaling.

Next, display processor 16 determines an intensity (k) of the filter response for the scaled pixel based on the symmetry (A) of the scaled pixel and subsequently determines a warped distance (s') based on the symmetry (A) of the scaled pixel and the intensity (k) of the filter response. During this process, display processor 16 tailors or "adapts" the filter to the content of image information 20, and more specifically to the values of the neighboring pixel values defined by image information 20. After adapting the filter, display processor 16 applies the filter based on the determined warped distance (s') to perform spatial variant interpolation (SVI) to determine the value of the scaled pixel.

Display processor 16 may determine the number of pixels values to interpolate by comparing the resolution of display 18 with that of image information 20. The difference between the display resolution and the resolution of image information 20 determines the amount of upscaling need to achieve the display resolution. After interpolating the value of each scaled pixel, display processor 16 stores these scaled pixel values with original pixel values defined by image information 20 as upscaled image information 12. In some embodiments, display processor 16 does not store these scaled pixel values but transmits these scaled pixel values as well as the original pixel values defined by image information 20 to drive display 18 as the scaled pixel values are determined. Upon completing the upscaling, display processor 16 transmits upscaled image information 12 to display 18 for display to the user.

Display 18 may comprise one of any of a variety of displays including a liquid crystal display (LCD), a cathode ray tube (CRT) display, a plasma display, a projection display, and any display capable of displaying upscaled image information 12. Display 18 may be integrated with or coupled to device 10. Display 18 maintains an inherent display resolution controlled by the set number of pixels to display an image. Exemplary resolutions defined by the number of pixel columns by the number of pixel rows include 800 by 600 pixels, 1024 by 768 pixels, 1280 by 768 pixels, 1280 by 800 pixels, 1280 by 1024 pixels, 1600 by 1200 pixels, 1680 by 1050 pixels, 1920 by 1200 pixels, and any other arrangement of pixels. In some embodiments, a user of mobile device 10 may select one of a plurality of resolutions for display 18 so long as the selected resolution does not exceed the inherent maximum resolution of display 18. In other embodiments, a designer may hard-code a resolution for display 18, and typically selects the inherent maximum resolution as the hard-coded resolution.

The upscaling techniques described herein allow mobile device 10 to perform relatively low complexity linear interpolation that yields upscaled image information 12 of relatively high clarity, i.e., with relatively little blurriness. The upscaling technique implemented by mobile device 10 is of low complexity because it implements a linear interpolation method instead of more computationally intensive interpolation methods, such as NEDI. Moreover, the upscaling techniques enable mobile device 10 to produce this high clarity result, in part, because it enables mobile device 10 to adapt the intensity (k) of the filter response to the plurality of neighboring pixel values of image information 20, providing content-adaptive interpolation. Thus, this technique allows mobile device 10 to determine some of the scaled pixel values according to one intensity k while determining other of the scaled pixel values according to another intensity k', as indicated by different groups of pixels that are neighbors to the particular pixel to be interpolated. Therefore, unlike some scaling techniques that define a constant, i.e., fixed, intensity for the filter response over the entire expanse of image information, the upscaling technique described herein adapts the intensity k to characteristics of image information 20 to provide higher clarity upscaled image information 12.

Figure 2:
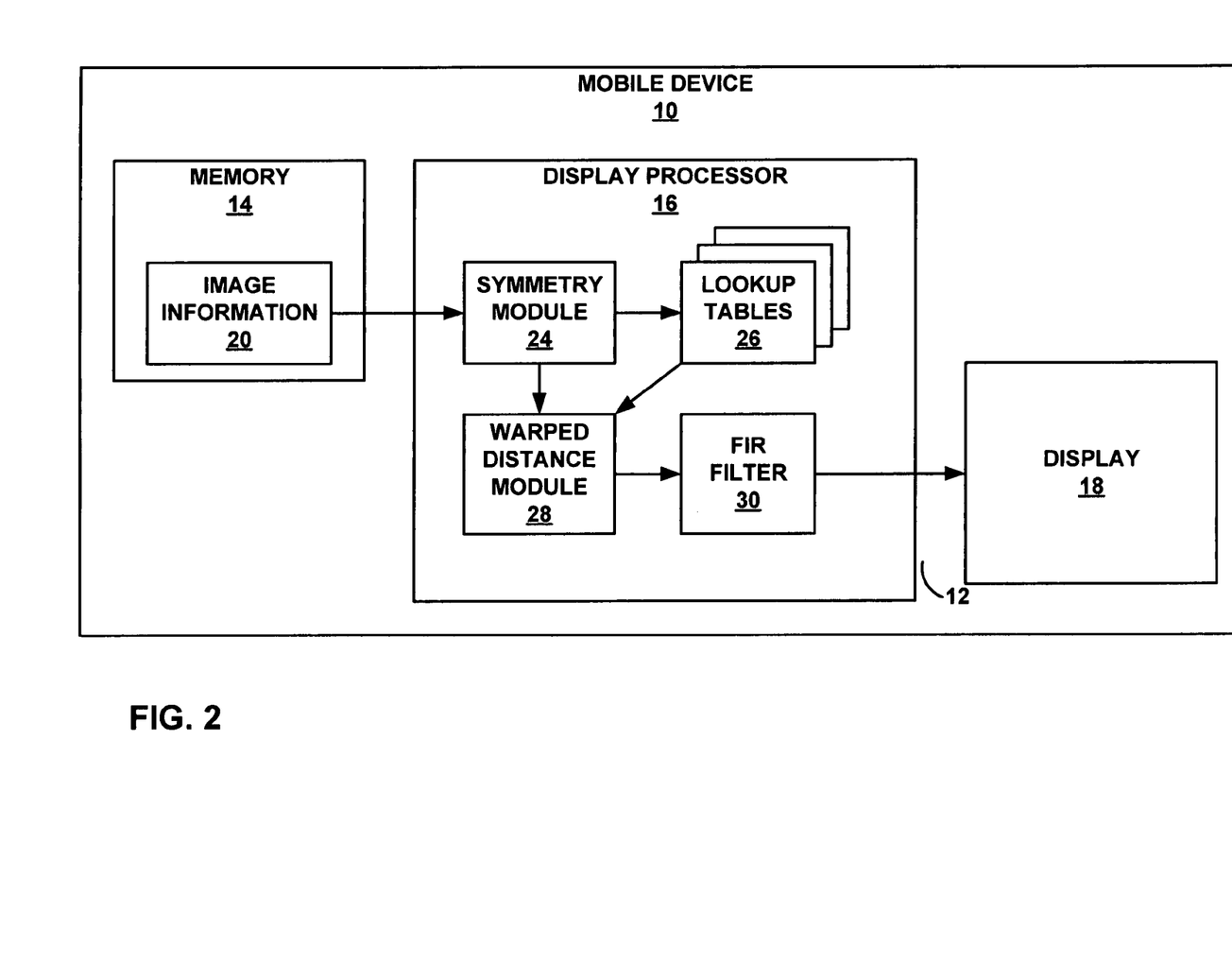
FIG. 2 is a block diagram illustrating the mobile device of FIG. 1 in further detail.

FIG. 2 is a block diagram illustrating mobile device 10 of FIG. 1 in further detail. As described above in reference to FIG. 1, mobile device 10 of FIG. 2 similarly includes memory 14, display processor 16, and display 18. Memory 14 stores image information 20. As illustrated in FIG. 2, display processor 16 includes symmetry module 24, lookup tables 26, warped distance module 28, and Finite Input Response (FIR) filter 30. While described below in reference to components 24, 26, 28 and 30, a single component or a plurality of components, such as shown in FIG. 2, may perform the operations ascribed to components 24-30. Also, depiction of components 24-30 is intended to highlight different functional aspects and should not necessarily be construed as representing separate hardware and/or software components.

A four-tap FIR filter for use as filter 30 will be described for purpose of illustration. The pixel to be interpolated, denoted by x, is calculated based on four original pixels, denoted by $x_{n+1}$, $x_{n-1}$, $x_{n+2}$, and $x_n$. For a row of pixels, the indices n+1 and n+2 may denote pixels to the right of the pixel x to be interpolated, while the indices n and n−1 may denote pixels to the left of the pixel x to be interpolated. The value (amplitude or intensity) of the interpolated and original pixels is denoted by f(x). Using an FIR filter, the value of the interpolated pixel x is obtained by:

$$f(x) = F[s, f(x_{n-1}), f(x_n), f(x_{n+1}), f(x_{n+2})], \quad (1)$$

where F[•] is a linear function, and s is the phase parameter: $s = x − x_n$ (0≤s≤1, by defining the distance between two adjacent original pixels to be 1). This generalized function applies to any four-tap FIR filter, including bilinear (although it has only two taps), bicubic, cubic-spline, and the like. For example, for upscaling at a ratio of 2, a single sample needs to be interpolated so that s=½. For an upscaling ratio of 4, there are three samples to interpolate and s=0.25, 0.5 and 0.75 for the three interpolated pixels, respectively.

Advantages of an FIR filter include simplicity, low computational complexity and capability of maintaining the values of the original samples. An FIR filter can be used for non-integer ratio scaling by simply adjusting the values of s. The value of s may be quantized into multiple levels (e.g., 32) between 0 and 1. Also, the coefficients for $f(x_{n-1})$, $f(x_n)$, $f(x_{n+1})$, $f(x_{n+2})$ at different interpolation phases can be preprogrammed.

For an SVI technique, the distance s in equation (1) can be modified such that pixels close to edge-boundaries are interpolated in an edge-oriented fashion. Using a warped-distance (WD) scheme, an SVI technique may be configured to apply an association rule that decides the side of the edge to which the interpolated pixel belongs. An exemplary association rule is given as:

$$A = \frac{|f(x_{n+1}) - f(x_{n-1})| - |f(x_{n+2}) - f(x_n)|}{L-1}, \text{ where } L = 256. \quad (2)$$

For the convenience of hardware implementation, equation (2) above can be modified as follows:

$$A = (|f(x_{n+1}) - f(x_{n-1})| - |f(x_{n+2}) - f(x_n)|) >> 8. \quad (3)$$

Equation (3) represents a simple rule of measuring the uniformity of pixel values on either side of an edge. If $|f(x_{n+1}) - f(x_{n-1})| \geq |f(x_{n+2}) - f(x_n)|$, the edge is more homogenous on the right side and the pixel to be interpolated should be associated with the right side. In this case, for a four-tap filter, more weight should be put on $x_{n+1}$, $x_{n+2}$. On the other hand, if $|f(x_{n+1}) - f(x_{n-1})| \leq |f(x_{n+2}) - f(x_n)|$, then the edge is more homogenous on the left side and the pixel to be interpolated should be associated with the left side. In this case, for a four-tap filter, more weight should be placed on $x_n$, $x_{n-1}$.

With further reference to FIG. 2, symmetry module 16 determines the symmetry (A) of a scaled pixel, i.e., the pixel x to be interpolated, based on a plurality of neighboring pixels within image information 20. As an example, symmetry module 16 may determine the symmetry according to equation (3) above. In equation (3) above, the plurality of neighboring pixels comprise pixels denoted by $x_{n+1}$, $x_{n-1}$, $x_{n+2}$, and $x_n$, and $f(x_{n+1})$, $f(x_{n-1})$, $f(x_{n+2})$, and $f(x_n)$ denote the values associated with the respective pixels $x_{n+1}$, $x_{n-1}$, $x_{n+2}$, and $x_n$. Lookup tables 26 store an association between zones of symmetry ("zones"), denoted by $A_0$-$A_n$, and predefined intensity values, denoted by $k_0$-$k_n$. The n indices for x and A are different.

Lookup tables 26 merely represent one type of data structure by which the association may be stored, and other data structures, such as linked lists, hash tables, trees, and binary trees, may store this association. Lookup tables 26 may store the association in a manner represented by the following equations (4):

$$k = k_0, \text{ for } 0 \leq |A| < A_1;$$

$$k = k_1, \text{ for } A_1 \leq |A| < A_2;$$

$$\ldots$$

$$k = k_{n-1}, \text{ for } A_{n-1} \leq |A| \leq 1, \quad (4)$$

where $0 < A_1 < A_2 < \ldots < A_{n-1} < 1$.

In equations (4) above, k represents the intensity of the filter response, $k_0$-$k_n$ denote predefined intensity values, and $A_0$-$A_n$ denote the edges of the zones of symmetry. The value k is varied based on the value of A, per equation (4), providing adjustment of the spatial variant interpolation filter response based on content characteristics of the image. In some embodiments, the k value may be selectively adjusted based on the A value in normal cases, or based on a fixed value if computational resources to compute A are scarce. As k is adaptive as a function of A, there may be different k values within the same image or video frame for different pixels to be interpolated. Notably, the value A may be expressed as an absolute value as it could be positive or negative.

In some embodiments, a frame may be characterized by a k map that assigns different values of k, e.g., to different areas, regions, pixel groups, or pixels. Hence, a frame may be preprocessed to determine values of k for predetermined regions. Then, the k value can be used for spatial variant interpolation for upscaled pixels, i.e., pixels to be interpolated, in each of those respective regions. In particular, the spatial variant interpolation technique may reference the k map to determine the particular k for a region as it produces one or more interpolated pixels in that region.

A designer may predefine lookup tables 26 by specifying values for $k_0$-$k_n$ and $A_0$-$A_n$. In some embodiments, however, display processor 16 automatically adapts either or both of $k_0$-$k_n$ and $A_0$-$A_n$ to one or more exemplary conditions, such as the quality of image information 20 being upscaled, the identity or type of application requesting display 18 to display image information 20, and the level of available system resources within mobile device 10. Moreover, lookup tables 26 may comprise one or more lookup tables, or more generally, data structures, that store one or more associations. Display processor 16 may associate each of these independent lookup tables 26 with a different application that requests display 18 to display image information 20. Alternatively, display processor 16 may associate each of these independent lookup tables 26 with a varying level of system resource use and/or quality of image information 20.

Warped distance module 28 determines a warped distance (s') based on the symmetry (A) of the scaled pixel and the intensity (k) of the filter response from symmetry module 24 and lookup tables 26. Warped distance module 28 may determine the warped distance (s') according to the following equation (5):

$$s' = s - kAs(s - 1) \quad (5)$$

where s denotes the distance of the scaled pixel to one of the plurality of neighboring pixels, A denotes the symmetry of the scaled pixel, and k denotes the intensity of the filter response for the scaled pixel. The value s' provides a phase modification as a function of s, A and k. In turn, the value k is modified as a function of A. In some scenarios, if k is set to 0, the interpolation technique reverts to spatial invariant interpolation. Otherwise, varying values of k result in varying values of s', and drive content-adaptive spatial variant interpolation (CA-SVI). The distance (s) between the scaled pixel to one of the plurality of neighboring pixels may be defined by either of the following equations (6):

$$s = x - x_n,$$
$$1 - s = x_{n+1} \quad (6)$$

where x denotes the position of the scaled pixel, $x_n$ denotes the position of the pixel to the left of the scaled pixel along the x-axis, and $x_{n+1}$ denotes the pixel to the right of the scaled pixel along the x-axis. As shown by equation (6), the distance between each pixel $x_n$ and $x_{n+1}$ has been normalized to one.

Warped distance module 28 may determine the warped distance (s') for instances where image information 20 includes color image information 20. If color image information 20 is encoded according to the RGB color format, for example, warped distance module 28 computes the warped distance (s') for the green (G) channel only and transmits this warped distance (s') for the green (G) channel to FIR filter 30 when interpolating all three color channel values, i.e., green (G), red (R), and blue (B) channels, of the scaled pixel. If color image information 20 is encoded according to the YCbCr color format, however, warped distance module 28 computes the warped distance (s') for only the luminance (Y) channel and transmits this warped distance (s') for the luminance (Y) channel to FIR filter 30 when interpolating the luminance (Y) channel value of the scaled pixel.

FIR filter 30 applies a filter based on the determined warped distance (s') to perform spatial variant interpolation to determine the value of the scaled pixel. FIR filter 30 may apply a filter as described by the following equation (7) below:

$$f(x) = \frac{1}{2}(-s'^3 + 2s'^2 - s')f(x_{n-1}) + \frac{1}{2}(3s'^3 - 5s'^2 + 2)f(x_n) + \frac{1}{2}(-3s'^3 + 4s'^2 + s')f(x_{n+1}) + \frac{1}{2}(s'^3 - s'^2)f(x_{n+2}) \quad (7)$$

where f(x) denotes the value of the scaled pixel, s' denotes the warped distance, the plurality of neighboring pixels comprise pixels denoted by $x_{n+1}$, $x_{n-1}$, $x_{n+2}$, and $x_n$, and $f(x_{n+1})$, $f(x_{n-1})$, $f(x_{n+2})$, and $f(x_n)$ denote the value associated with the respective pixels $x_{n+1}$, $x_{n-1}$, $x_{n+2}$, and $x_n$. Equation (7) describes spatial-variant bicubic interpolation that is content adaptive, or merely "adaptive," because the intensity (k) of the filter response, which factors into the warped distance (s'), varies according to the values of the surrounding plurality of neighboring pixels, $f(x_{n+1})$, $f(x_{n-1})$, $f(x_{n+2})$, and $f(x_n)$. Although described herein in reference to spatial-variant bicubic interpolation, the upscaling techniques described herein may allow for other levels of interpolation, such as bilinear interpolation, e.g., as described by equation (8) below:

$$f(x) = (1-s')f(x_n) + s'f(x_{n+1}) \quad (8)$$

FIR filter 30 may also offer flexibility in that it may not always apply spatial-variant interpolation, but rather the more typical spatial-invariant bicubic interpolation in some circumstances. If one of the above lookup tables 26 specifies an intensity value equal to zero, whereupon the intensity (k) of the filter response is set to zero and the warped distance (s') therefore equals the distance (s), FIR filter 30 applies a spatial-invariant bicubic filter according to equation (7) with s substituted for s'. Therefore, FIR filter 30 may adapt in such a manner as to perform spatial-invariant bicubic interpolation to image information 20 and such adaptation may occur after determining the quality of image information 20, the identity of an application that requested display 18 to display image information 20, and/or the available system resources of mobile device 10, as described above. In other words, in some cases, FIR filter 30 may be configured to apply spatial variant interpolation, but be adaptive to switch to spatial invariant interpolation under certain conditions.

As an illustration, the following values of k could be used for different absolute values of A to trigger either spatial variant interpolation or spatial invariant interpolation:

$$k = 4, \text{ for } 0 \le |A| < 0.45;$$
$$k = 0, \text{ for } 0.45 \le |A| < 1. \quad (9)$$

Figure 3A:
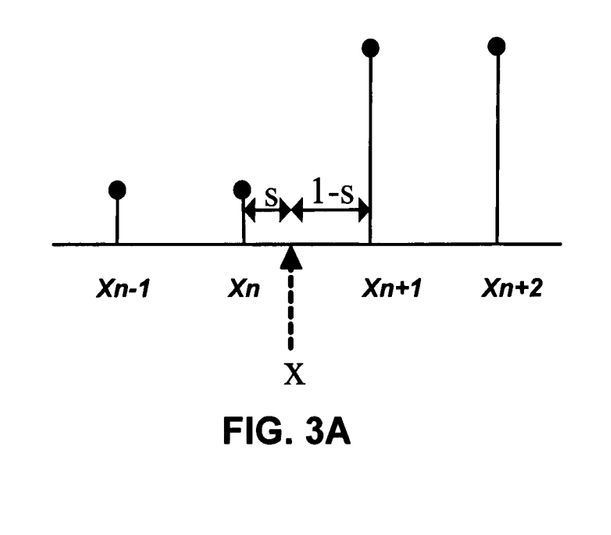
FIGS. 3A and 3B are plots illustrating interpolation of a pixel based on adjacent pixels.
Figure 3B:
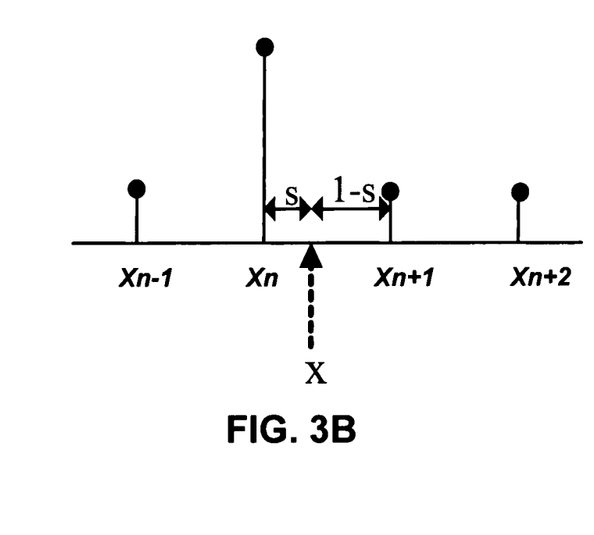

FIGS. 3A and 3B are plots illustrating interpolation of a pixel value x based on values of adjacent pixels $x_{n-1}$, $x_n$, $x_{n+1}$, $x_{n+2}$. FIGS. 3A and 3B illustrate plotting of pixel samples for the above values of k set forth in equation (9) when the absolute value of A=0 and the absolute value of A=0.75, respectively. With the samples plotted as in FIG. 3A, A=0 and k=4. Hence, for the example of FIG. 3A, spatial variant interpolation (SVI) is to be used. With the samples plotted as in FIG. 3B, however, |A|=0.75, and k=0. In this case, when k=0, spatial invariant interpolation is to be used instead of spatial variant interpolation (SVI).

The embodiment illustrated in FIG. 2 is for exemplary purposes only. Display processor 16 need not reside within display processor 16 of mobile device 10 and may reside within any device capable of storing, manipulating, and generating image information. As described above, display processor 16 may perform upscaling according to the herein described upscaling techniques, thereby offering mobile device 10 a relatively low complexity method to generate relatively high clarity upscaled image information 12.

Figure 4:
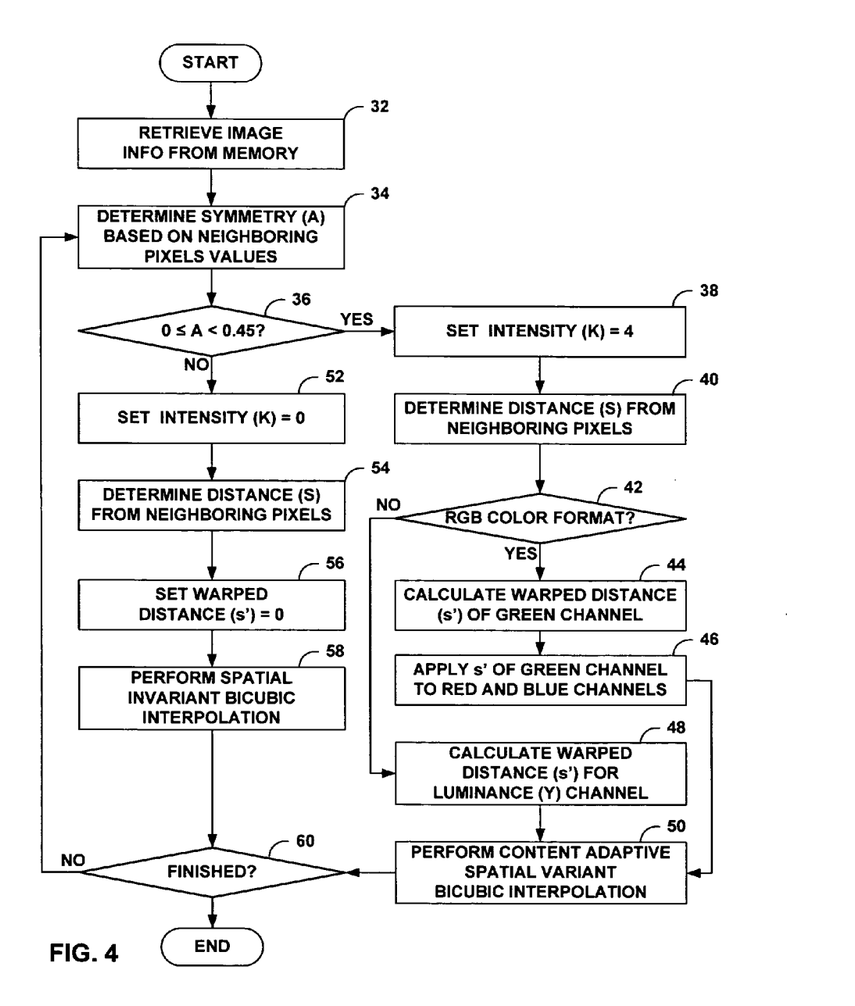
FIG. 4 is a flowchart illustrating exemplary operation of the display processor of FIG. 2 in adaptively upscaling image information to generate upscaled image information.

FIG. 4 is a flowchart illustrating exemplary operation of display processor 16 of FIG. 2 in adaptively upscaling image information 20 to generate upscaled image information 12 using interpolation techniques as described in this disclosure. Initially, a designer may configure lookup tables 26, or some other data structure as described above, to store an association between zones of symmetry ($A_0$-$A_n$) with intensity values ($k_0$-$k_n$). The designer may also select which method of interpolation, i.e., either bilinear or bicubic interpolation, display processor 16 should apply to image information 20.

Once configured, mobile device 10 may interact with a user (not shown), whereupon the user may interact with one or more software programs, such as an application or game, and/or hardware components, such as a digital video camera or digital still image camera component. Through this interaction, the software program and/or hardware component may store image information 20 to memory 14, and display processor 16 may retrieve image information 20 from memory 14 for display on display 18 (32).

Upon retrieving image information 20, display processor 16 may perform a final set of operations, as described above. In particular, display processor 16 may upscale image information 20 according to the upscaling technique described herein. First, symmetry module 24 of display processor 16 may determine the symmetry (A) of the scaled pixel based on the neighboring pixel values (34). Symmetry module 24 may determine the symmetry (A) according to above equation (1) and as described below in reference to FIGS. 5A and 5B. Next, symmetry module 24 accesses lookup tables 26 to determine the associated intensity value ($k_0$-$k_n$) that corresponds to the zone of symmetry ($A_0$-$A_n$) in which the symmetry (A) lies.

In the example of FIG. 4, two zones of symmetry exist and are defined by $A_0$=0.45. Thus, modifying equation (2) to this specific configuration provides equation (9) above, which describes the association stored in one of lookup tables 26, and is again reproduced below:

k=4, for 0≤|A|<0.45;

k=0, for 0.45≤|A|<1.     (9)

Here, as mentioned above, the intensity k of the filter response equals the intensity value $k_0$, which equals 4, if the symmetry A is greater than or equal to 0 and less than $A_0$, which equals 0.45. The intensity k equals the intensity value $k_1$, which equals 0, if the symmetry A is greater than or equal to $A_0$, which equals 0.45, but less than 1. Because the symmetry A must lie between 0 and 1, only $A_0$ is required to delineate two zones of symmetry, and display processor 16 only needs to determine whether it lies within the first zone of symmetry (36). While described in reference to two zones of symmetry, two or more zones of symmetry may exist, as shown by equation (4), and the upscaling technique described herein should not be limited to strictly two zones of symmetry. The number and size of zones may be adaptive in some embodiments, e.g., based on availability of computing resources and other performance characteristics.

If the symmetry (A) lies within the first zone of symmetry ("YES" 36), i.e., 0≤A<0.45, lookup table 26 returns intensity value $k_0$, or 4, to warped distance module 28, which in turn sets the intensity k equal to 4 (38). After setting the intensity (k) to 4, warped distance module 28 determines the distance (s) between the scaled pixel and the neighboring pixels (40). Warped distance module 28 may compute the distance (s) according to equation (4) above. If image information 20 is encoded according to the RGB color format ("YES" 42), warped distance module 28 determines the warped distance (s') for the green (G) channel (44). Warped distance module 28 may compute the warped distance (s') for the green (G) channel according to the above equation (3). Warped distance module 28 sets the warped distance (s') for each of the red (R) and blue (B) channels equal to the warped distance (s') computed for the green (G) channel (46). The green (G) channel may be chosen to determine the phase modification term s' to avoid gray imbalance and use the channel that appears most intense to the human eye.

If image information 20 is not encoded according to the RGB color format but according to the YCbCr color format ("NO" 42), warped distance module 28 determines the warped distance (s') only for the luminance (Y) channel of image information 20 (48). While only the RGB and YCbCr color formats are discussed herein, other color formats may cause warped distance module 28 to compute warped distances for varying channels of these other color formants, and the upscaling technique described herein should not be strictly limited to the RGB and YCbCr color formats.

After determining the warped distance(s) (s'), warped distance module 28 provides the warped distance(s) (s') to FIR filter 30. FIR filter 30 performs content adaptive spatial variant bicubic interpolation (50) via application of a filter that may conform to that described above by equation (5). FIR filter 30 performs this adaptive spatial variant bicubic interpolation on one or more channels of image information 20 to generate a scaled pixel value of upscaled image information 16. For example, if image information 20 is encoded according to the RGB color format, FIR filter 30 may perform this interpolation on the red (R), green (G), and blue (B) channels of image information 20, but uses only the warped distance (s') determined for the green (G) channel. Interpolating all three RGB channels according to the warped distance (s') determined for the green (G) channel typically lessens the likelihood of color bleeding in upscaled image information 12. As another example, if image information 20 is encoded according to the YCbCr color channel, FIR filter 30 may perform this interpolation on only the luminance (Y) channel of image information 20. FIR filter 30 only interpolates the Y channel in this example because it represents a true color intensity value while both the chromatic blue (Cb) and chromatic red (Cr) channels represent offsets and not true color values.

If, however, the symmetry lies within the second zone ("NO" 36), i.e., 0.45≤A<1, lookup table 26 returns intensity value $k_1$, or 0, to warped distance module 28, which in turn sets the intensity k equal to 0 (52). After setting the intensity (k) to 0, warped distance module 28 determines the distance (s) between the scaled pixel and the neighboring pixels (54). Warped distance module 28 may compute the distance (s) according to equation (4) above. In this instance, because k equals 0, warped distance module 28 may immediately set the warped distance (s') equal to zero (0) (56). Warped distance module 28 may compute the warped distance (s') according to the above equation (3), which when k equals 0, reduces equation (3) to s'=s.

When s' equals s, FIR filter 30 performs spatial invariant bicubic interpolation (58), i.e., rather than spatial variant interpolation, via application of a filter that may be described by the above equation (5). Via application of the filter, FIR filter 30 generates a scaled pixel value of upscaled image information 12.

Upon interpolating a scaled pixel value, display processor 16 determines whether it has finished interpolating all necessary scaled pixel values (60). Typically, display processor 16 applies FIR filter 30 first along the rows of the pixel values defined by image information 20 and second along the columns of the pixel values defined by image information 20. Thus, display processor 16 finishes after applying FIR filter 30 along the last column of image information 20. If not finished ("NO" 60), display processor 20 applies FIR filter 30 to the next scaled pixel value but only after determining the symmetry (A), intensity (k), distance (s) and warped distance (s') of this new scaled pixel (34-60). However, if finished ("YES" 60), display processor 16 may transmit upscaled image information 12 for display on display 18.

Figure 5A:
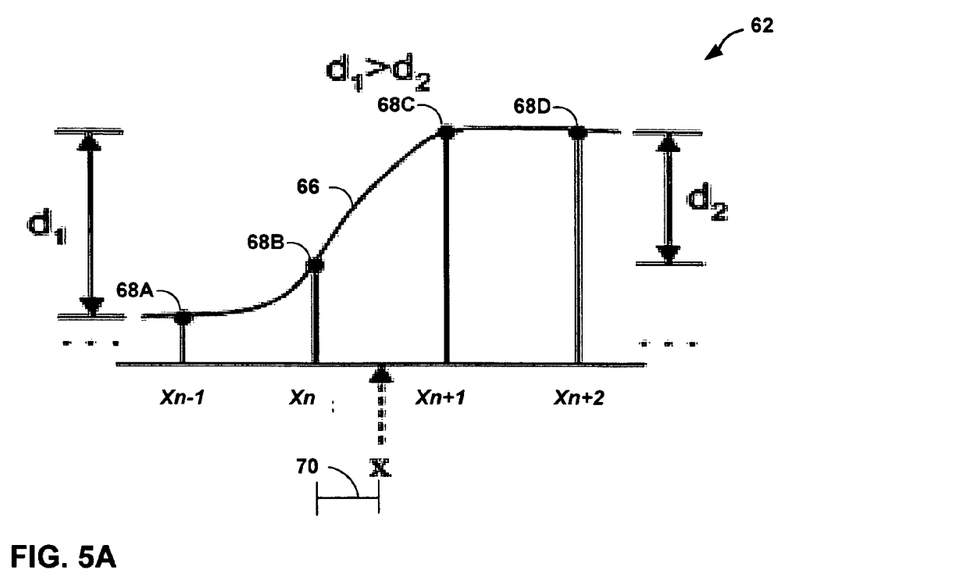
FIGS. 5A and 5B are graphs illustrating exemplary one-dimensional pixel arrangements, in which the display processor of FIG. 2 interpolates the value f(x) of a scaled pixel (x).
Figure 5B:
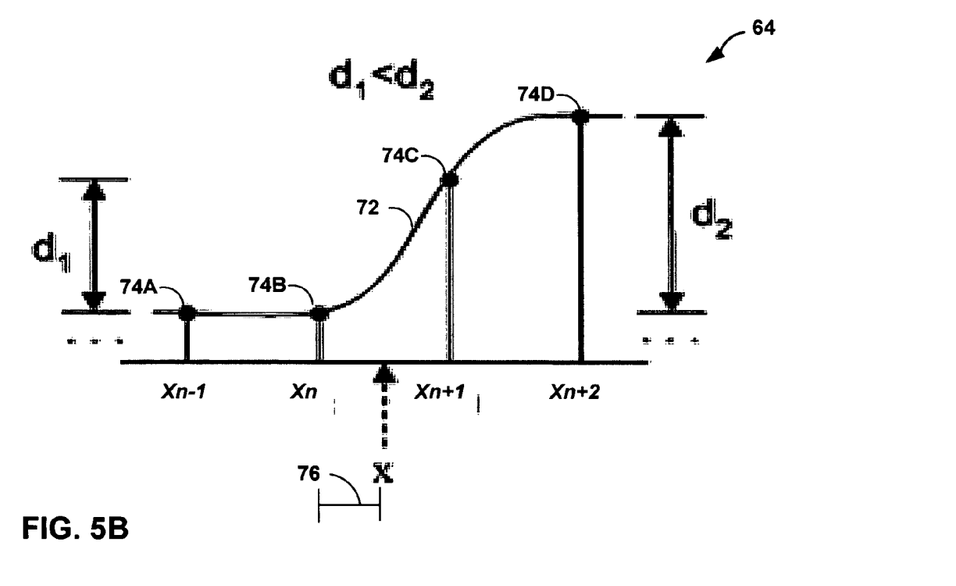

FIGS. 5A and 5B are graphs illustrating an exemplary one dimensional pixel arrangement, in which display processor 20 of FIG. 2 interpolates a value (f(x)) of a scaled pixel (x). FIG. 5A shows a graph 62 in which the scaled pixel (x) lies along an edge having a more homogenous right side. FIG. 5B shows a graph 64 in which the scaled pixel (x) lies along an edge having a more homogenous left side. While both of graphs 62, 64 illustrate a one-dimensional pixel arrangement, this is merely exemplary and typically image information 20 includes information relating to two-dimensional pixel arrangements. However, because FIR filter 30 can be applied first to rows, a one-dimensional pixel arrangement, and next to columns, another one-dimensional pixel arrangement, it is appropriate to discuss the upscaling technique in this context.

Referring to FIG. 5A, graph 62 includes a sigmoid edge line 66 defined by pixel values 68A-68D, or $f(x_{n-1})$, $f(x_n)$, $f(x_{n+1})$, and $f(x_{n+2})$, respectively. Graph 62 further includes scaled pixel x, which lies between pixels $x_n$ and $x_{n+1}$. In order to interpolate a value for scaled pixel x, symmetry module 24 of display processor 16 first determines the symmetry (A) of scaled pixel x according to equation (1) above. In determining the symmetry (A), symmetry module 24 may compute both of $|(f(x_{n+1})-f(x_{n-1})|$ and $|f(x_{n+2})-f(x_n)|$ of equation (1), which are represented in graph 62 by distance 1 ($d_1$) and distance 2 ($d_2$), respectively. If $d_1$ is greater than $d_2$, the edge has a more homogenous right side, and the scaled pixel value should lie closer to those pixels values $f(x_{n+1})$ and $f(x_{n+2})$ of the right side to maintain definitive edges. To obtain this result, scaled pixel x is warped closer to the right side. Warping scaled pixel x requires that the intensity (k) of the filter response be defined greater than or less than 0.

After determining the symmetry (A), symmetry module 28 accesses lookup tables 26 to determine the associated intensity value, as described above. If the symmetry (A) lies within the above described first zone of symmetry, i.e., if $|d_1-d_2|$ is greater than or equal to 0 but less than 0.45, warped distance module 28 receives the first intensity value ($k_0$=4) from lookup table 26 and sets the intensity k=$k_0$. However, if the symmetry lies within the second zone of symmetry, i.e., if $|d_1-d_2|$ is greater than or equal to 0.45 but less than 1, warped distance module 28 receives the second intensity value ($k_1$=0) from lookup table 26 and sets the intensity k=$k_1$. Next, warped distance module 28 determines the distance (s) 70 between scaled pixel x and pixel x, according to one of equations (4) above. If the intensity k equals 4, warped pixel module determines the warped distance (s') according to the above equation (3). If the intensity k equals 0, warped pixel module determines that the warped distance (s') equals the distance (s) and scaled pixel x is not warped. Upon calculating the warped distance (s'), display processor 16 applies FIR filter 30 to perform either of spatial variant or spatial invariant bicubic interpolation, as described above.

Referring to FIG. 5B, graph 64 includes a sigmoid edge line 72 defined by pixel values 74A-74D, or $f(x_{n-1})$, $f(x_n)$, $f(x_{n+1})$, and $f(x_{n+2})$ respectively. Graph 64 further includes scaled pixel x, which lies between pixels $x_n$ and $x_{n+1}$. In order to interpolate a value for scaled pixel x, symmetry module 24 of display processor 16 first determines the symmetry (A) of scaled pixel x according to equation (1) above. In determining the symmetry (A), symmetry module 24 may compute both of $|(f(x_{n+1})-f(x_{n-1})|$ and $|f(x_{n+2})-f(x_n)|$ of equation (1), which are represented in graph 64 by distance 1 ($d_1$) and distance 2 ($d_2$), respectively. If $d_2$ is greater than $d_1$, the edge has a more homogenous left side, and the scaled pixel value should lie closer to those pixels values $f(x_{n-1})$ and $f(x_n)$ of the left side to maintain definitive edges. To obtain this result, scaled pixel x is warped closer to the left side. Warping scaled pixel x requires that the intensity (k) of the filter response be defined to be greater than or less than 0.

After determining the symmetry (A), symmetry module 28 accesses lookup tables 26 to determine the associated intensity value, as described above. If the symmetry (A) lies within the above described first zone of symmetry, i.e., if $|d_1-d_2|$ is greater than or equal to 0 but less than 0.45, warped distance module 28 receives the first intensity value ($k_0$=4) from lookup table 26 and sets the intensity k=$k_0$. However, if the symmetry lies within the second zone of symmetry, i.e., if $|d_1-d_2|$ is greater than or equal to 0.45 but less than 1, warped distance module 28 receives the second intensity value ($k_1$=0) from lookup table 26 and sets the intensity k=$k_1$. Next, warped distance module 28 determines the distance (s) 76 between scaled pixel x and pixel $x_n$ according to one of equations (4) above. If the intensity k equals 4, warped pixel module determines the warped distance (s') according to the above equation (5). If the intensity k equals 0, warped pixel module determines that the warped distance (s') equals the distance (s) and scaled pixel x is not warped. Upon calculating the warped distance (s'), display processor 16 applies FIR filter 30 to perform either of spatial variant or spatial invariant bicubic interpolation, as described above.

This disclosure describes adaptive spatial variant interpolation (SVI) techniques for image upscaling. In various embodiments, the interpolation techniques described in this disclosure may support low complexity upscaling of image information while promoting high image quality, including enhanced sharpness, higher contrast and accurate interpolation. The interpolation techniques may be applied using generalized finite impulse response (FIR) filters. In some embodiments, the interpolation techniques may be content-adaptive to provide accurate interpolation while suppressing significant artifacts associated with sharp edges. In addition, the interpolation techniques may be readily applicable to upscaling of color imagery and video, e.g., in both YCbCr (luminance, blue chrominance, red chrominance) and RGB (red, green, blue) formats.

The upscaling techniques described herein may be implemented in hardware, software, firmware, or any combination thereof. If implemented in software, the techniques may be directed to a computer-readable medium comprising program code providing machine-executable instructions, that when executed in a device that captures images, performs one or more of the techniques described herein. In that case, the computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a microprocessor or digital signal processor (DSP) may execute instructions stored in memory in order to carry out one or more of the techniques described herein. In some cases, the techniques may be executed by a DSP that invokes various hardware components. In other cases, the techniques described in this disclosure may be implemented by a microprocessor, one or more application specific integrated circuits (ASICs), one or more field programmable gate arrays (FPGAs), or some other hardware-software combination.

Various embodiments of the disclosure have been described. These and other embodiments are within the scope of the following claims.

The invention claimed is:

1. A method comprising:
   determining, via a processor, a symmetry (A) of a scaled pixel in an image based on content characteristics of neighboring pixels in the image;
   determining, via the processor, an intensity (k) of a spatial variant interpolation filter based on the symmetry (A);
   adjusting, via the processor, the spatial variant interpolation filter based on the intensity (k), wherein adjusting the spatial variant interpolation filter includes determining a warped distance (s') based on the symmetry (A) of the scaled pixel and the intensity (k) of the filter response, and adjusting the spatial variant interpolation filter based on the warped distance (s'); and
   applying, via the processor, the spatial variant interpolation filter to interpolate the scaled pixel,
   wherein determining the intensity (k) of the filter response comprises:
   determining whether the symmetry (A) resides within one of a plurality of zones ($A_0$-$A_n$); and setting the intensity (k) to one of a plurality of intensity values ($k_0$-$k_n$) associated with the one of the plurality of zones ($A_0$-$A_n$) in which the symmetry (A) lies.

2. The method of claim 1, wherein determining the symmetry (A) of the scaled pixel comprises determining the symmetry (A) of the scaled pixel according to the equation:

$$A=(|f(x_{n+1})-f(x_{n-1})|-|f(x_{n+2})-f(x_n)|)>>8$$

where the neighboring pixels comprise pixels denoted by $x_{n+1}$, $x_{n-1}$, $x_{n+2}$, and $x_n$, and $f(x_{n+1})$, $f(x_{n-1})$, $f(x_{n+2})$, and $f(x_n)$ denote the value associated with the respective pixels $x_{n+1}$, $x_{n-1}$, $x_{n+2}$, and $x_n$.

3. The method of claim 1, further comprising selectively setting the intensity (k) to equal zero such that the warped distance (s') equals a distance (s) from the scaled pixel to one of the neighboring pixels to transform the spatial variant interpolation filter into a spatial invariant interpolation filter, and applying the spatial invariant interpolation filter to interpolate the scaled pixel.

4. The method of claim 1, wherein setting the intensity (k) comprises:
accessing one of a plurality of data structures that store the association of zones ($A_0$-$A_n$) to the plurality of intensity values ($k_0$-$k_n$) based on the determined symmetry (A) to retrieve one of the plurality of intensity values ($k_0$-$k_n$); and
setting the intensity (k) to the retrieved one of the plurality of intensity values ($k_0$-$k_n$).

5. The method of claim 4, wherein accessing one of the plurality of data structures comprises accessing one of the plurality of data structures based on one or more of available system resources, and a type of an application requesting the image.

6. The method of claim 1, wherein determining the intensity (k) of the filter response comprises:
determining a quality of the image; and
determining the intensity (k) of the filter response for the scaled pixel based on the determination of the quality of the image.

7. The method of claim 1, wherein determining the warped distance (s') comprises determining the warped distance (s') according to the equation:

$$s'=s-kAs(s-1)$$

where s denotes the distance of the scaled pixel to one of the neighboring pixels, A denotes the symmetry of the scaled pixel, and k denotes the intensity of the filter response for the scaled pixel.

8. The method of claim 1,
wherein determining the warped distance (s') comprises determining the warped distance (s') for the green (G) channel of the image encoded according to the RGB color format, and
wherein applying the filter comprises applying the filter to the red (R), green (G), and blue (B) channels based on the warped distance (s') determined for the green (G) channel of the image to perform spatial variant interpolation to determine the value of the scaled pixel.

9. The method of claim 1,
wherein determining the warped distance (s') comprises determining the warped distance (s') for the luminance (Y) channel of the image encoded according to the YCbCr color format;
wherein applying the filter comprises applying the filter to the luminance (Y) channel based on the warped distance (s') determined for the luminance (Y) channel to perform spatial variant interpolation to determine the value of the scaled pixel.

10. The method of claim 1, wherein applying the filter comprises applying a filter based on the determined warped distance (s') to perform spatial variant bicubic interpolation to determine the value of the scaled pixel.

11. The method of claim 10, wherein applying the filter further comprises applying the filter described by the equation:

$$f(x) = \frac{1}{2}(-s'^3 + 2s'^2 - s')f(x_{n-1}) + \frac{1}{2}(3s'^3 - 5s'^2 + 2)f(x_n) + \frac{1}{2}(-3s'^3 + 4s'^2 + s')f(x_{n+1}) + \frac{1}{2}(s'^3 - s'^2)f(x_{n+2})$$

where f(x) denotes the value of the scaled pixel, s' denotes the warped distance, the neighboring pixels comprise pixels denoted by $x_{n+1}$, $x_{n-1}$, $x_{n+2}$, and $x_n$, and $f(x_{n+1})$, $f(x_{n-1})$, $f(x_{n+2})$, and $f(x_n)$ denote the value associated with the respective pixels $x_{n+1}$, $x_{n-1}$, $x_{n+2}$, and $x_n$.

12. The method of claim 1, further comprising:
generating upscaled image that includes the value of the scaled pixel; and
displaying the upscaled image via a display.

13. A device comprising:
a memory that stores an image; and
a processor that determines a symmetry (A) of a scaled pixel in an image based on content characteristics of neighboring pixels in the image, determines an intensity (k) of an interpolation filter based on the symmetry (A), adjusts the interpolation filter based on the intensity (k), and applies the spatial variant interpolation filter to interpolate the scaled pixel,
wherein the processor that adjusts the interpolation filter based on the intensity (k) determines a warped distance (s') based on the symmetry (A) of the scaled pixel and the intensity (k) of the filter response, and adjusts the spatial variant interpolation filter based on the warped distance (s'), and
wherein the processor determines whether the symmetry (A) resides within one of a plurality of zones ($A_0$-$A_n$,), and sets the intensity (k) to one of a plurality of intensity values ($k_0$-$k_n$) associated with the one of the plurality of zones ($A_0$-$A_n$) in which the symmetry (A) lies.

14. The device of claim 13, wherein the processor determines the symmetry (A) of the scaled pixel according to the equation:

$$A=(|f(x_{n+1})-f(x_{n-1})|-|f(x_{n+2})-f(x_n)|)>>8$$

where the neighboring pixels comprise pixels denoted by $x_{n+1}$, $x_{n-1}$, $x_{n+2}$, and $x_n$, and $f(x_{n+1})$, $f(x_{n-1})$, $f(x_{n+2})$, and $f(x_n)$ denote the value associated with the respective pixels $x_{n+}$.

15. The device of claim 13, wherein the processor selectively sets the intensity (k) to equal zero such that the warped distance (s') equals a distance (s) from the scaled pixel to one of the neighboring pixels to transform the spatial invariant interpolation filter into a spatial invariant interpolation filter, and applies the spatial invariant interpolation filter to interpolate the scaled pixel.

16. The device of claim 13, wherein the memory stores a plurality of data structures that store an association between zones of symmetry ($A_0$-$A_n$) and a plurality of intensity values ($k_0$-$k_n$), and the processor accesses one of the plurality of data structures that stores the association of zones ($A_0$-$A_n$) to the plurality of intensity values ($k_0$-$k_n$) based on the determined symmetry (A) to retrieve one of the plurality of intensity values ($k_0$-$k_n$), and sets the intensity (k) to the retrieved one of the plurality of intensity values ($k_0$-$k_n$).

17. The device of claim 16, wherein the processor accesses one of the plurality of data structures based on one or more of available system resources, and a type of application requesting the image.

18. The device of claim 13, wherein the processor determines quality of the image, and determines the intensity (k) of the filter response for the scaled pixel based on the determination of the quality of the image.

19. The device of claim 13, wherein the processor determines the warped distance (s') according to the equation:

$$s'=s-kAs(s-1)$$

where s denotes the distance of the scaled pixel to one of the neighboring pixels, A denotes the symmetry of the scaled pixel, and k denotes the intensity of the filter response for the scaled pixel.

20. The device of claim 13, wherein the processor determines the warped distance (s') for the green (G) channel of the image encoded according to the RGB color format, and applies the filter to the red (R), green (G), and blue (B) channels based on the warped distance (s') determined for the green (G) channel of the image to perform spatial variant interpolation to determine the value of the scaled pixel.

21. The device of claim 13, wherein the processor determines the warped distance (s') for the luminance (Y) channel of the image encoded according to the YCbCr color format, and applies the filter based on the warped distance (s') determined for the luminance (Y) channel to perform spatial variant interpolation to determine the value of the scaled pixel.

22. The device of claim 13, wherein the processor applies the filter based on the determined warped distance (s') to perform spatial variant bicubic interpolation to determine the value of the scaled pixel.

23. The device of claim 22, wherein the processor applies the filter described by the equation:

$$f(x) = \frac{1}{2}(-s'^3 + 2s'^2 - s')f(x_{n-1}) + \frac{1}{2}(3s'^3 - 5s'^2 + 2)f(x_n) + \frac{1}{2}(-3s'^3 + 4s'^2 + s')f(x_{n+1}) + \frac{1}{2}(s'^3 - s'^2)f(x_{n+2})$$

where f(x) denotes the value of the scaled pixel, s' denotes the warped distance, the neighboring pixels comprise pixels denoted by $x_{n+1}$, $x_{n-1}$, $x_{n+2}$, and $x_n$, and $f(x_{n+1})$, $f(x_{n-1})$, $f(x_{n+2})$, and $f(x_n)$ denote the value associated with the respective pixels $x_{n+1}$, $x_{n-1}$, $x_{n+2}$, and $x_n$.

24. The device of claim 13, further comprising a display to display upscaled image, wherein the processor generates the upscaled image that includes the value of the scaled pixel.

25. A non-transitory computer-readable medium comprising instructions for causing a programmable processor to:
determine a symmetry (A) of a scaled pixel in an image based on content characteristics of neighboring pixels in the image;
determine an intensity (k) of a spatial variant interpolation filter based on the symmetry (A);
adjust the spatial variant interpolation filter based on the intensity (k), wherein the instructions that cause the processor to adjust the spatial variant interpolation filter based on the intensity (k) comprise instructions that cause the processor to determine a warped distance (s') based on the symmetry (A) of the scaled pixel and the intensity (k) of the filter response, and adjust the spatial variant interpolation filter based on the warped distance (s'); and
apply the spatial variant interpolation filter to interpolate the scaled pixel,
wherein the instructions cause the processor to determine whether the symmetry (A) resides within one of a plurality of zones ($A_0$-$A_n$), and set the intensity (k) to one of a plurality of intensity values ($k_0$-$k_n$) associated with the one of the plurality of zones ($A_0$-$A_n$) in which the symmetry (A) lies.

26. The non-transitory computer-readable medium of claim 25, wherein the instructions cause the processor to determine the symmetry (A) of the scaled pixel according to the equation:

$$A=(|f(x_{n+1})-f(x_{n-1})|-|f(x_{n+2})-f(x_n)|)>>8$$

where the neighboring pixels comprise pixels denoted by $x_{n+1}$, $x_{n-1}$, $x_{n+2}$, and $x_n$, and $f(x_{n+1})$, $f(x_{n-1})$, $f(x_{n+2})$, and $f(x_n)$ denote the value associated with the respective pixels $x_{n+1}$, $x_{n-1}$, $x_{n+2}$, and $x_n$.

27. The non-transitory computer-readable medium of claim 25, wherein the instructions cause the processor to selectively set the intensity (k) to equal zero such that the warped distance (s') equals a distance (s) from the scaled pixel to one of the neighboring pixels to transform the spatial invariant interpolation filter into a spatial invariant interpolation filter, and apply the spatial invariant interpolation filter to interpolate the scaled pixel.

28. The non-transitory computer-readable medium of claim 25, wherein the instructions cause the processor to access one of a plurality of data structures that store the association of zones ($A_0$-$A_n$) to the plurality of intensity values ($k_0$-$k_n$) based on the determined symmetry (A) to retrieve one of the plurality of intensity values ($k_0$-$k_n$), and set the intensity (k) to the retrieved one of the plurality of intensity values ($k_0$-$k_n$).

29. The non-transitory computer-readable medium of claim 28, wherein the instructions cause the processor to access one of the plurality of data structures based on one or more of available system resources, and an application requesting the image.

30. The non-transitory computer-readable medium of claim 25, wherein the instructions cause the processor to determine the quality of the image, and determine the intensity (k) of the filter response for the scaled pixel based on the determination of the quality of the image.

31. The non-transitory computer-readable medium of claim 25, wherein the instructions cause the processor to determine the warped distance (s') according to the equation:

$$s'=s-kAs(s-1)$$

where s denotes the distance of the scaled pixel to one of the neighboring pixels, A denotes the symmetry of the scaled pixel, and k denotes the intensity of the filter response for the scaled pixel.

32. The non-transitory computer-readable medium of claim 25, wherein the instructions cause the processor to determine the warped distance (s') for the green (G) channel of the image encoded according to the RGB color format, and apply the filter to the red (R), green (G), and blue (B) channels based on the warped distance (s') determined for the green (G) channel of the image to perform spatial variant interpolation to determine the value of the scaled pixel.

33. The non-transitory computer-readable medium of claim 25, wherein the instructions cause the processor to determine the warped distance (s') for the luminance (Y)

channel of the image encoded according to the YCbCr color format, and apply the filter to the luminance (Y) channel based on the warped distance (s') determined for the luminance (Y) channel to perform spatial variant interpolation to determine the value of the scaled pixel.

34. The non-transitory computer-readable medium of claim 25, wherein the instructions cause the processor to apply the filter based on the determined warped distance (s') to perform spatial variant bicubic interpolation to determine the value of the scaled pixel.

35. The non-transitory computer-readable medium of claim 25, wherein the instructions cause the processor to apply the filter described by the equation:

$$f(x) = \frac{1}{2}(-s'^3 + 2s'^2 - s')f(x_{n-1}) + \frac{1}{2}(3s'^3 - 5s'^2 + 2)f(x_n) + \frac{1}{2}(-3s'^3 + 4s'^2 + s')f(x_{n+1}) + \frac{1}{2}(s'^3 - s'^2)f(x_{n+2})$$

where f(x) denotes the value of the scaled pixel, s' denotes the warped distance, the neighboring pixels comprise pixels denoted by $x_{n+1}$, $x_{n-1}$, $x_{n+2}$, and $x_n$, and $f(x_{n+1})$, $f(x_{n-1})$, $f(x_{n+2})$, and $f(x_n)$ denote the value associated with the respective pixels $x_{n+1}$, $x_{n-1}$, $x_{n+2}$, and $x_n$.

36. The non-transitory computer-readable medium of claim 25, further comprising instructions that cause the processor to generate upscaled image that includes the value of the scaled pixel, drive a display device to display the upscaled image.

37. A device comprising:
means for determining a symmetry (A) of a scaled pixel in an image based on content characteristics of neighboring pixels in the image;
means for determining an intensity (k) of a spatial variant interpolation filter based on the symmetry (A);
means for adjusting the spatial variant interpolation filter based on the intensity (k), wherein the means for adjusting includes means for determining a warped distance (s') based on the symmetry (A) of the scaled pixel and the intensity (k) of the filter response, and means for adjusting the spatial variant interpolation filter based on the warped distance (s'); and
means for applying the spatial variant interpolation filter to interpolate the scaled pixel,
wherein the means for determining the intensity (k) of the filter response comprises:
means for determining whether the symmetry (A) resides within one of a plurality of zones ($A_0$-$A_n$); and
means for setting the intensity (k) to one of a plurality of intensity values ($k_0$-$k_n$) associated with the one of the plurality of zones ($A_0$-$A_n$) in which the symmetry (A) lies.

* * * * *